United States Patent
Cha et al.

(10) Patent No.: US 9,397,716 B2
(45) Date of Patent: Jul. 19, 2016

(54) INPUT DEVICE WITH WIRELESS HEADSET FUNCTION FOR PORTABLE TERMINAL

(71) Applicant: Samsung Electronics Co., Ltd., Gyeonggi-do (KR)

(72) Inventors: Kwang-Hwan Cha, Gyeonggi-do (KR); Jae-Chul Lee, Seoul (KR); Byoung-Uk Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 138 days.

(21) Appl. No.: 13/957,860

(22) Filed: Aug. 2, 2013

(65) Prior Publication Data
US 2014/0038525 A1  Feb. 6, 2014

(30) Foreign Application Priority Data
Aug. 3, 2012  (KR) .................. 10-2012-0085184

(51) Int. Cl.
*H04B 1/3827* (2015.01)
*G06F 3/0354* (2013.01)

(52) U.S. Cl.
CPC .......... *H04B 1/3827* (2013.01); *G06F 3/03545* (2013.01)

(58) Field of Classification Search
CPC ..................... H04B 2001/3866; H04B 1/3827; H04B 1/3888; H04R 2499/11
See application file for complete search history.

(56) References Cited

U.S. PATENT DOCUMENTS

| | | | |
|---|---|---|---|
| 4,847,887 A * | 7/1989 | Suzuki et al. | 455/569.2 |
| 6,724,903 B2 | 4/2004 | Niederdrank | |
| 6,821,819 B1 | 11/2004 | Benavides et al. | |
| 2001/0034249 A1 * | 10/2001 | Peuhu | G09F 9/301 455/566 |
| 2003/0063045 A1 * | 4/2003 | Fleming | G06F 3/03545 345/30 |
| 2004/0101310 A1 * | 5/2004 | Wang | 398/140 |
| 2005/0130594 A1 * | 6/2005 | Kowalski | H04B 1/3833 455/66.1 |
| 2005/0207605 A1 * | 9/2005 | Dehe | H04R 19/04 381/369 |
| 2006/0034476 A1 | 2/2006 | Glezerman | |
| 2006/0046650 A1 | 3/2006 | Kohli et al. | |

(Continued)

FOREIGN PATENT DOCUMENTS

| | | |
|---|---|---|
| EP | 0 625 864 A1 | 11/1994 |
| EP | 2 343 630 A2 | 7/2011 |

(Continued)

*Primary Examiner* — Cindy Trandai
(74) *Attorney, Agent, or Firm* — Cha & Reiter, LLC.

(57) ABSTRACT

Disclosed is a pen-like input device for a portable terminal which can provide the function of a wireless headset. The input device includes a housing configured with at least first and second spaced apart microphone holes formed therein. A transmitting/receiving (T/R) module is disposed inside the housing and coupled to the microphone element and a speaker. The T/R module transmits/receives communication signals to and from the portable terminal. A sound transferring part is provided within the housing to transfer sounds to a microphone element via a plurality of air pathways connected to the first and second microphone holes.

22 Claims, 7 Drawing Sheets

(56) References Cited

U.S. PATENT DOCUMENTS

| | | | |
|---|---|---|---|
| 2006/0068851 A1* | 3/2006 | Ashman, Jr. | G06F 1/1626 455/566 |
| 2007/0298827 A1* | 12/2007 | Hansson | 455/550.1 |
| 2008/0159558 A1* | 7/2008 | Lan | H04R 1/345 381/91 |
| 2009/0147968 A1* | 6/2009 | Inoda | G10L 21/0208 381/94.1 |
| 2009/0161886 A1* | 6/2009 | Tanaka et al. | 381/91 |
| 2009/0251338 A1 | 10/2009 | Marggraff et al. | |
| 2009/0310811 A1* | 12/2009 | Inoda | H04R 1/083 381/362 |
| 2010/0142743 A1* | 6/2010 | Tanaka et al. | 381/346 |
| 2010/0167799 A1* | 7/2010 | Makihata | B81B 7/0077 455/575.1 |
| 2010/0189300 A1* | 7/2010 | Inoda | H04R 1/38 381/361 |
| 2010/0202649 A1* | 8/2010 | Inoda | H04R 1/021 381/361 |
| 2011/0096044 A1* | 4/2011 | Raif | G06F 3/03545 345/179 |
| 2011/0164001 A1* | 7/2011 | Seo | G06F 3/03545 345/179 |
| 2011/0176690 A1* | 7/2011 | Takano et al. | 381/92 |
| 2011/0195745 A1* | 8/2011 | Inoda | H04M 1/035 455/550.1 |
| 2012/0243721 A1* | 9/2012 | Inoda | H04R 3/005 381/365 |
| 2012/0288130 A1* | 11/2012 | Dehe | H04R 19/04 381/353 |
| 2012/0328142 A1* | 12/2012 | Horibe | H04R 3/005 381/355 |
| 2013/0106800 A1* | 5/2013 | Yilmaz | G06F 3/03545 345/179 |
| 2013/0136292 A1* | 5/2013 | Inoda | H04R 1/38 381/355 |
| 2013/0163790 A1* | 6/2013 | Shimizu | H04R 3/00 381/122 |
| 2014/0038525 A1* | 2/2014 | Cha | H04B 1/3827 455/41.2 |

FOREIGN PATENT DOCUMENTS

| | | |
|---|---|---|
| JP | 11-275197 A | 10/1999 |
| JP | 2001-211089 A | 8/2001 |
| JP | 2002-135880 A | 5/2002 |

* cited by examiner

INPUT DEVICE WITH WIRELESS HEADSET FUNCTION FOR PORTABLE TERMINAL

CLAIM OF PRIORITY

This application claims the priority under 35 U.S.C. §119 (a) to Korean Application Serial No. 10-2012-0085184, which was filed in the Korean Intellectual Property Office on Aug. 3, 2012, the entire content of which is hereby incorporated by reference.

BACKGROUND

1. Technical Field

The present disclosure relates generally to an input device for a portable terminal. More particularly, it relates to a hand held input device for inputting information on a portable terminal touch screen, and having a microphone and speaker for short range communication with the portable terminal in a wireless headset function.

2. Description of the Related Art

In general, a portable terminal refers to a hand held electronic device capable of transmitting and/or receiving an information or communication signal. Examples of portable terminals include smart phones, tablet PCs, personal digital assistants (PDAs), notebook computers, and so forth. A multifunction portable terminal may have functionality including mobile communications, electronic note taking, internet connection, a multimedia function, etc.

As portable terminals mainly used for mobile communications are becoming generalized and multimedia services using portable terminals are being commercialized, a trend has emerged in which various input devices and touchscreen displays have increased in size to improve the user experience. The desire continues, however, to design light weight and thin portable terminals.

Input devices for inputting information through touch screens, such as stylus pens, are useful in some portable terminals. When the tip of an input device ("manipulation member") contacts a touch screen, the portable terminal is driven or information desired by a user is input. Recent portable terminals employ customized pen-like input devices for inputting a user's handwritten notes, where the portable terminal recognizes and organizes the notes and so forth.

A tradeoff exists between the size of a display and convenience in use as a hand held phone, e.g., cell phone. For example, by using a portable terminal such as a tablet PC, a user can easily use a multimedia function while carrying the portable terminal, but it is becoming inconvenient to perform a voice communication due to a large size thereof. Accordingly, wireless headsets, for example, through Bluetooth based on wireless near field communications are becoming widely used so that a voice communication function of a portable terminal can be easily implemented. However, a drawback of the wireless headset is that it needs to be carried separately, and coupled with a larger portable terminal to carry, the user's convenience is compromised.

To overcome the disadvantages of the wireless headset, efforts to integrate a pen-like input device (a "pen", for brevity) and a wireless headset are being made. With this approach, a microphone, a speaker, and short range communication electronics are each integrated within the pen. A short range communication protocol, e.g., Bluetooth, is established between the pen and the portable terminal. Thus the user is able to mount the pen to a shirt pocket or the like and communicate in a phone call using the portable terminal as a base. That is, the pen functions as a substitute for a wireless headset.

FIG. 1 is a perspective view of an input device of a portable terminal (i.e., a pen) 10 capable of implementing both an input and a communication according to the related art. FIG. 2A is a sectional view of the input device 10 taken along line A-A' of FIG. 1. FIG. 2B is a functional block of the input device 10 in a communication system. Referring to FIGS. 1, 2A and 2B, the input device 10 includes a housing 11 and an input module 12 which is composed of a body 12b (shown schematically in FIG. 2B) within the housing and a tip 12a extending from the housing 11. The tip 12a allows a user to input touch commands to a touch panel (not illustrated) of a portable terminal 20. A transmitting/receiving (T/R) module 13 including an antenna 17 is disposed within the housing 11 to implement short range communications (e.g. Bluetooth) with portable terminal 20. During a phone call, portable terminal 20 communicates the user's voice signals received by microphone 14 and processed and transmitted by T/R module 13 to a base station 30 communicatively connected to a third party (not shown). Voice signals transmitted by the third party are routed in the opposite direction, received, processed and routed by T/R module 13 as sound signals to a speaker 15 for output. In this case although the speaker and the speaker hole are not specifically shown, in a broad sense, the speaker is configuration of one of the speaker hole, in a narrow sense, the speaker is configured to generate sound in one configuration of the T/R module, and the speaker hole is configured to be connected to the speaker to be discharged to the outside the sound generated from the speaker.

The input module 12 protrudes to a lower side of the housing 11 and is mounted to an inner portion of the housing 11 with respect to the tip 12a ("manipulation member") contacting the touch panel. The T/R module 13 is located just above the input module 12 within housing 11. A microphone hole 11a is formed in the housing 11 to provide an input air conduit for the user's voice sounds to travel and be picked up by the microphone 14. The microphone hole 11a is formed at a center region of the housing, close to a location where the T/R module 13 is mounted. In detail, the microphone hole 11a is formed on the housing 11 close to a location where the input module 12 faces the T/R module 13 The speaker 15 is provided at an upper end of the housing 11.

The pen-like input device 10 has a size similar to that of a pen which can be gripped by a user. The input module 12 is disposed on a "near end" of the pen 10 while the T/R module 13 extends towards the opposite, "far end" of the pen. Accordingly, the microphone hole 11a and the speaker 15 are formed fairly close to each other, such that sounds output by speaker 15 are disadvantageously introduced through the microphone hole 11a.

As the microphone hole 11a is formed in a central region of the pen 10, a user's hand may grip the pen 10 at the location of the microphone hole 11a during a phone call, thereby blocking the hole and attenuating sound waves traveling towards the microphone 14. Accordingly, the user's voice sounds as received by the microphone are attenuated and performance of the microphone 14 is degraded. Further, when the pen 10 is held to the user's head during use, with the speaker 15 adjacent the user's ear, the user's cheek may contact and block the microphone hole 11a. The user's voice incident upon the microphone 14 may be attenuated in this condition also, thereby diminishing performance.

SUMMARY

An aspect of the present disclosure is to provide an input device for a portable terminal, which includes a microphone module that can be easily used, and in which sounds can be stably introduced into the microphone module.

Provided is a pen-like input device for a portable terminal which can provide the function of a wireless headset. The input device includes a housing configured with at least first and second spaced apart microphone holes formed therein. A transmitting/receiving (T/R) module is disposed inside the housing and coupled to a microphone element and to a speaker. The T/R module transmits/receives communication signals to and from the portable terminal. A sound transferring part is provided within the housing to transfer sounds to the microphone element via a plurality of air pathways connected to the first and second microphone holes.

An input module for inputting touch commands to the portable terminal may be mounted at a near side of the housing, while the T/R module for performing near field Bluetooth communications with the portable terminal may be provided behind the input module within the housing.

The input device may include a stylus pen.

In accordance with another aspect, an input device for a portable terminal includes a T/R module provided inside the input device and to which a microphone element and a speaker are electrically coupled to implement near field Bluetooth communications. A sound transferring part forms a plurality of paths for providing sounds to the microphone element. The sound transferring part may be formed of a rubber material.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
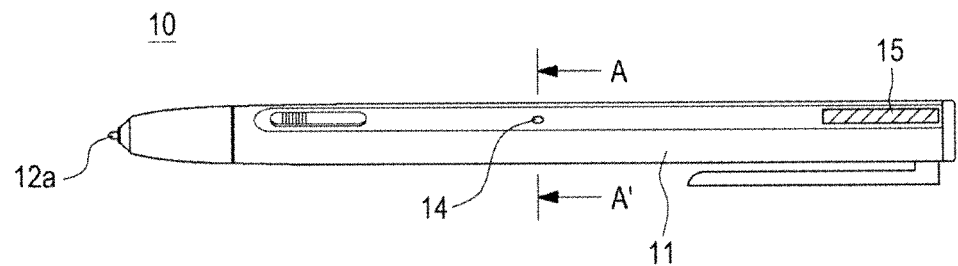
FIG. 1 is a view schematically illustrating an input device of a portable terminal according to the related art.

Hereinafter, an auxiliary device of a portable terminal according to the present invention will be described with reference to the accompanying drawings. In the process, the thickness of the lines and the sizes of the constituent elements illustrated in the drawings may be illustrated to be exaggerated for clarity and convenience. The terms described below are terms defined in consideration of the functions in the disclosed embodiments, and may differ from bibliographic definitions. Thus, the terms should be understood based on the context of the specification. Further, ordinal numbers such as first and second are used only to distinguish the objects having the same name, but the order may be arbitrarily determined.

An input device for a portable terminal of the present invention will be described with reference to FIGS. 3 to 10, and in the following description, a stylus pen, in detail, a Bluetooth pen for near field communications will be exemplified as the input device. However, an input device in accordance with the invention is not limited thereto. Herein, an input device generally refers to a device having an auxiliary function, and need not be used for touch input commands on a touchscreen of the portable terminal. Any configuration equipped with the auxiliary function and a transmitting/receiving (T/R) module may be modified freely. In the presently disclosed embodiment, as a T/R module is provided together with an input module which allows an input while contacting a touch panel, they are generally referred to as an input device.

Figure 2A:
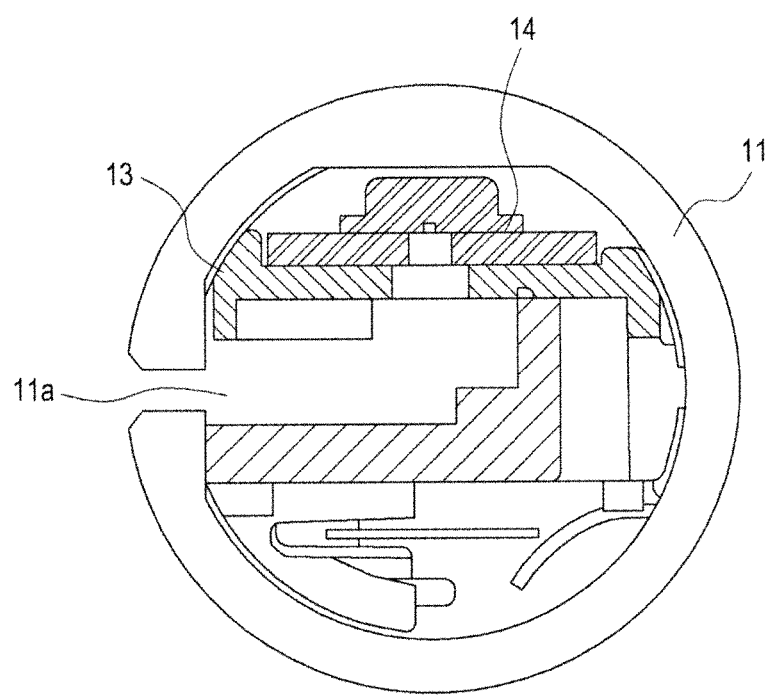
FIG. 2A is a sectional view taken along line A-A' of FIG. 1.
Figure 2B:
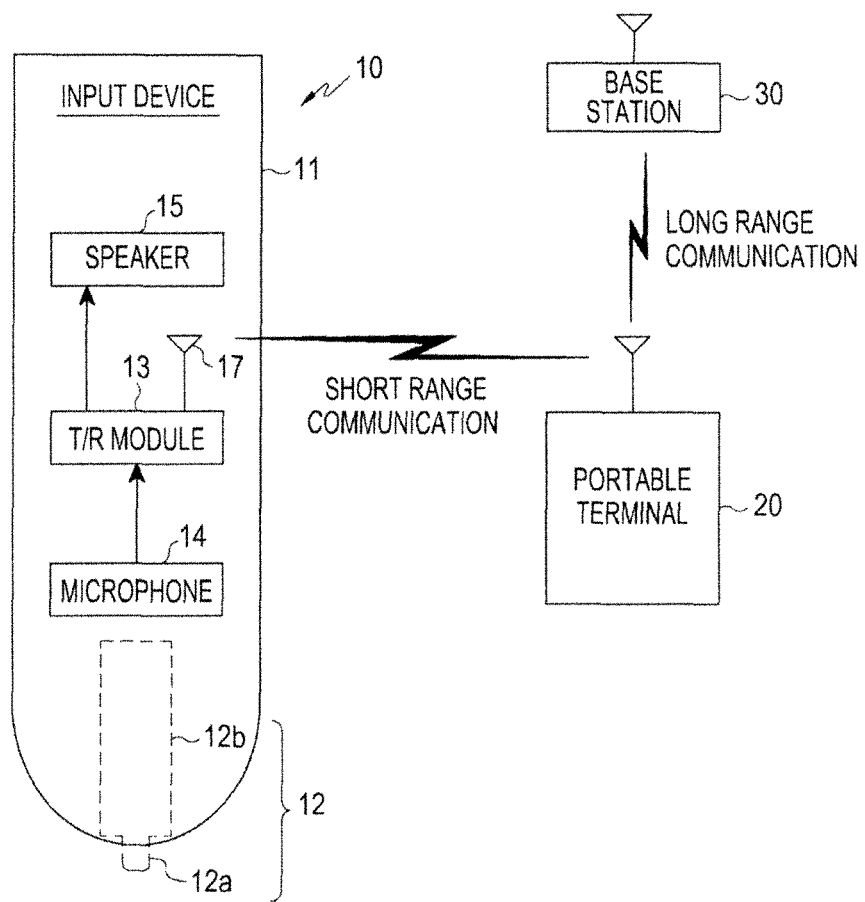
FIG. 2B is a functional block of a related art input device in a communication system.
Figure 3:
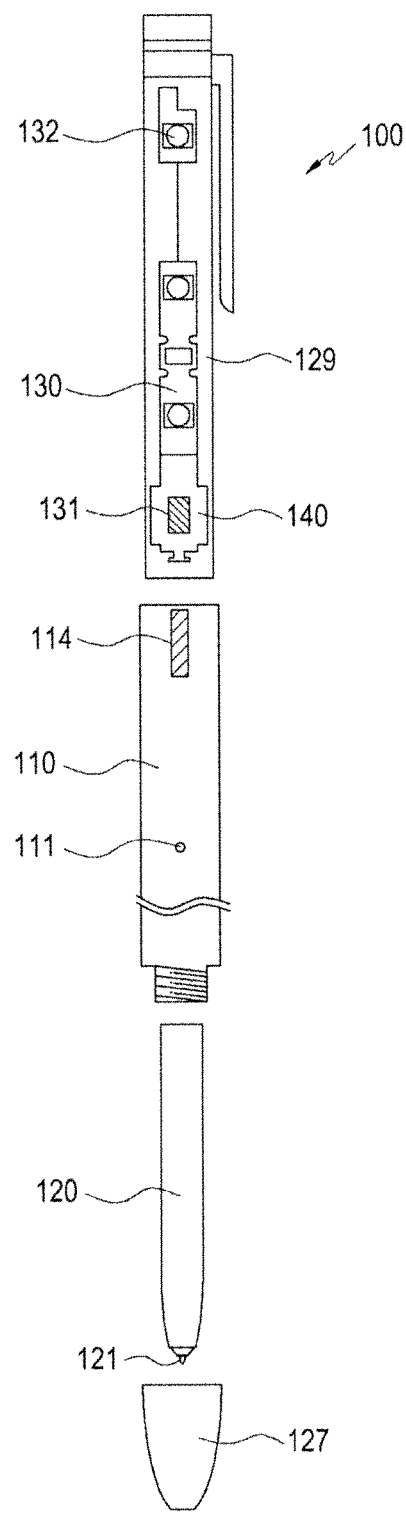
FIG. 3 is an exploded/side, partial internal view illustrating an input device of a portable terminal according to an embodiment of the present invention.
Figure 4:
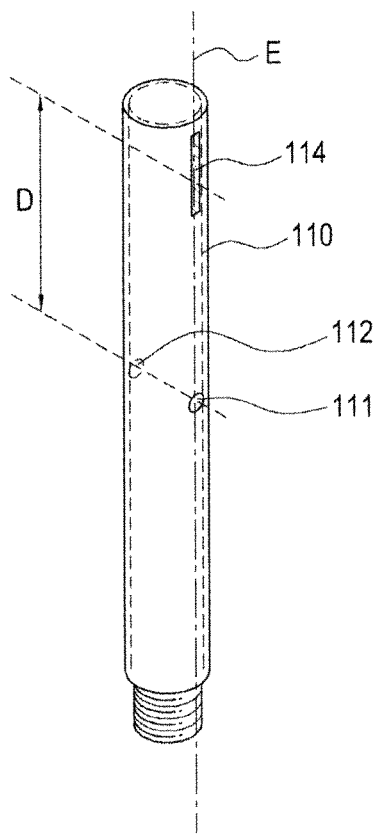
FIG. 4 is a view illustrating a housing of the input device of FIG. 3.
Figure 5:
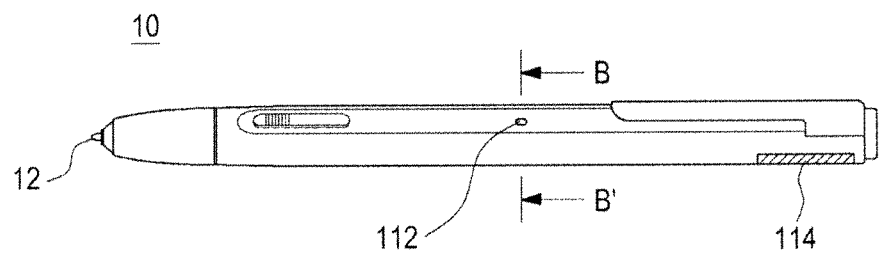
FIG. 5 is a view illustrating an assembled state of the input device of FIG. 3.

FIG. 3 is an exploded/side, partial internal view illustrating an input device 100 for a portable terminal according to a disclosed embodiment. FIG. 4 is a perspective view illustrating only an outer housing 110 of the input device of FIG. 3. FIG. 5 is a perspective view of the input device 100 in an assembled, operational state. Input device 100 may be used with a portable terminal 20 in the communication environment as shown in FIG. 2B in the manner described above. Referring collectively to FIGS. 3-5, pen-like input device 100 includes cylindrical outer housing 110 and an inner cylindrical housing 129 which is inserted within outer housing 110. An input module 120 is housed partially within a near end housing cap 127 and the outer housing 110. A transmitting/receiving (T/R) module 130 and a sound transferring part 140, a speaker 132 and a microphone element 131 are each disposed within the inner housing 129. Alternatively, inner housing 129 can be omitted, and only one housing 110 houses all the components.

At least first and second microphone holes 111 and 112 are preferably provided on opposite sides of a central region of housing 110 (only hole 111 is shown in FIG. 3). When inner housing 129 is fully inserted within outer housing 110, the microphone element 131 is in the vicinity of the apertures 111, 112, and speaker 132 is adjacent to a speaker window 114 on the outer housing 110. Input sound, such as the user's voice during a phone call, enters holes 111 and 112 through different internal channels of sound transferring part 140 and excites microphone element 131 to generate an electrical audio signal. This audio signal is processed and transmitted by T/R module 130 to a base portable terminal 20 (shown in FIG. 2) in a short range communication protocol.

Figure 9:
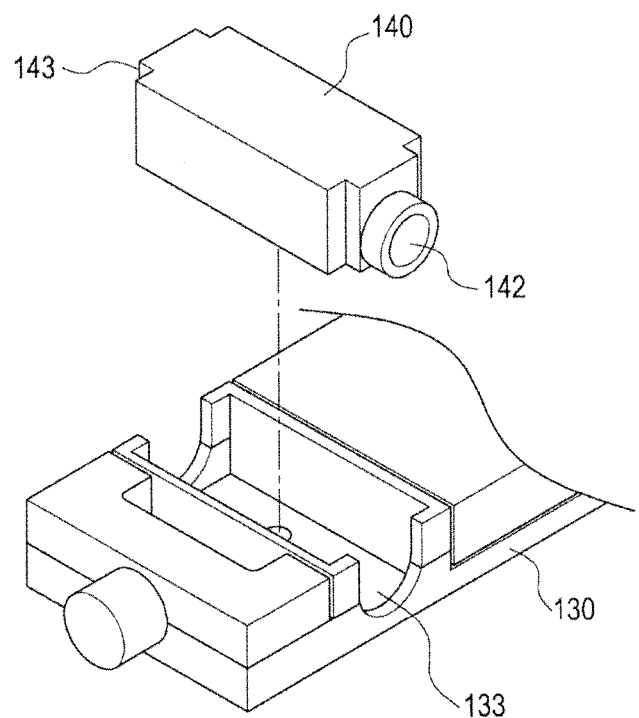
FIG. 9 is an enlarged view illustrating a state where a sound transferring part is separated from a mounting groove of FIG. 8.
Figure 10:
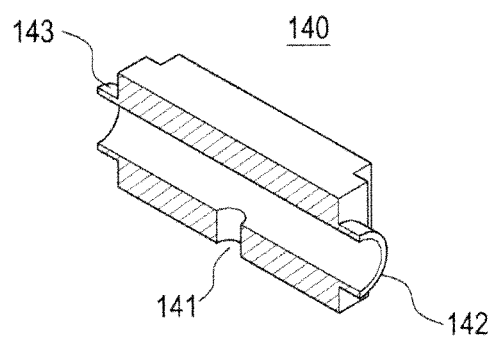
FIG. 10 is a perspective view illustrating a cutaway section of an inner side of the sound transferring part of FIG. 9.

Referring momentarily to FIGS. 9 and 10, perspective and cut-away views of the sound transferring part 140 are shown. FIG. 9 also illustrates a partial perspective view of T/R module 130, upon which the sound transferring part 140 is mounted. The sound transferring part 140 includes first and second tubular sound input ports 142 and 143 on opposing sides, and a transversely oriented hole 141 in a central region thereof. When the inner housing 129 as shown in FIG. 1 is fully inserted within outer housing 110, input ports 142 and 143 align with apertures 111 and 112. Further, the hole 141 is communicatively coupled to the microphone element 131. In this manner, sound waves entering holes 111 and/or 112 are efficiently routed through separate air pathways of the sound transferring part 140 to excite the microphone element 131. Accordingly, if hole 111 is unintentionally covered via contact with the user, sound can still enter the input device 100 through hole 112 for efficient excitation of microphone element 131. Thereby, dampening of the user's voice due to the blockage is lessened and microphone performance can remain acceptable.

With continued reference to FIGS. 3-5, the housing 110 sequentially accommodates the input module 120, the sound transferring part 140, and the T/R module 130 which will be described below in further detail. Input device 100 when assembled has an elongated shape (long in a lengthwise direction thereof) allowing a user to grip and use the device. The input module 120 is disposed on a near end of input device 100; the speaker 132 is located at the opposite, far end of device 100. When the device 100 is fully assembled, the T/R module 130 is centrally located, but slightly closer to the far end of the device 10. Input module 120, which is housed within housing 110 on the near end of the device 100, includes a manipulation member ("tip") 121 which protrudes from one end of the housing 110, allowing the user to contact it with a touch panel (not illustrated) of the portable terminal 20 to effect touch input commands. When separated from the housing 110, a separate configuration for contacting the touch panel may be achieved by using just the input module 120 if the user so desires.

Figure 6:
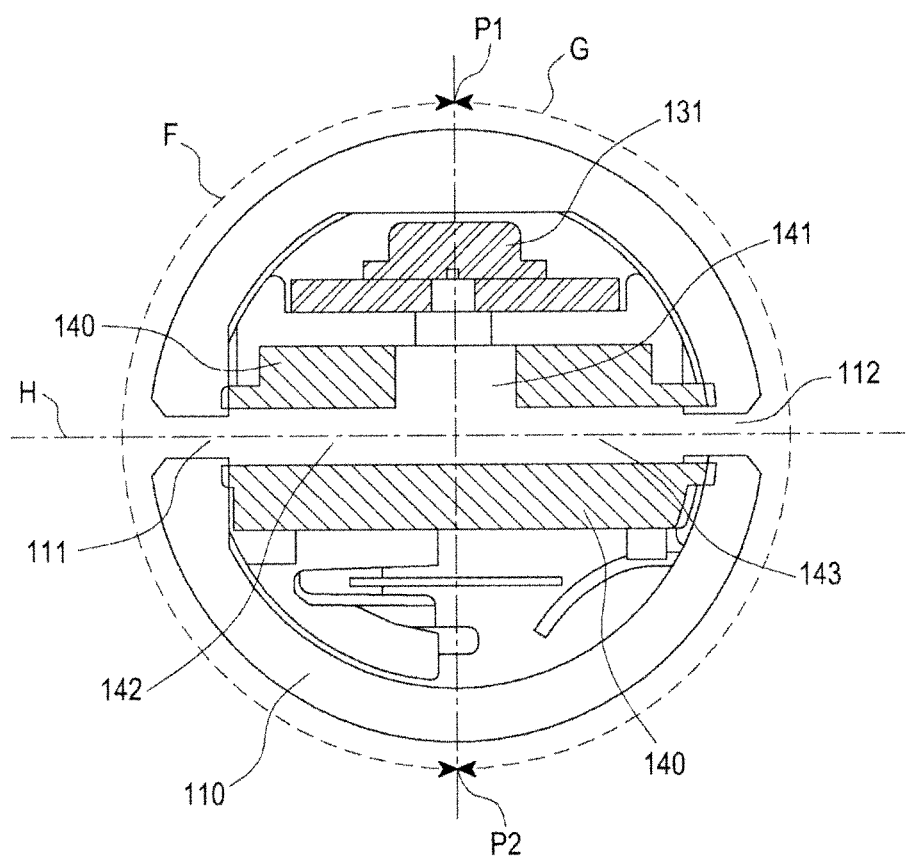
FIG. 6 is a sectional view taken along line B-B' of FIG. 5.

FIG. 6 is a sectional view taken along line B-B' of FIG. 5. Referring collectively to FIGS. 3-6, in the disclosed example, first and second microphone holes 111 and 112 operate as input ports for ambient sound entering the holes to reach the microphone element 131 via separate paths. As such, these holes 111, 112 are each said to be "communicatively coupled" to microphone element 131. Further, the speaker window 114 which may have a mesh cover (not shown) is adjacent to speaker 132, the latter being electrically coupled to T/R module 130 to receive output sound signals. In the disclosed example, first microphone hole 111 is provided diametrically opposite the second microphone hole 112 (i.e., on opposite ends of a diameter of housing 110). First hole 111 is on the same longitudinal line E (see FIG. 4) as that of the speaker window 114.

The second microphone hole 112 is located on an opposite surface of the housing 110. i.e., 180 degrees away in terms of arc degrees (considering the circular cross section of housing 110). That is, the holes 111, 112 are shown diametrically opposite. However, the locations of the first and second microphones 111 and 112 are not limited thereto. For example, an arc distance between the holes 111, 112 in the range of 90 to 270 degrees may be suitable. That is, referring to FIG. 6, with hole 112 at the position shown, i.e., at a center point of a diametric cut of the circular cross section, the hole 111 may be designed anywhere in other embodiments along path F, between points P1 and P2, corresponding to the range of 90-270 degrees in arc distance away.

Further, in other embodiments, instead of aligning speaker window 114 with hole 111 in the longitudinal direction along line E as shown in FIG. 4, they may be offset angularly.

As will be described below, the microphone element 131 is engaged with sound paths and the speaker window 114 is adjacent the speaker 132; first and second sound paths (air pathways) 142 and 143 are provided aligned in a diametric line H between holes 111 and 112. The input to the first sound path 142, which coincides with the hole 111, is provided on the same line E (refer to FIG. 4) as the speaker window 114. Alternatively, this input to first sound path 142 is provided anywhere along the arc F of the housing 110 within a range of 90 degrees on opposite sides of line E. In a further alternative embodiment, the second microphone hole 112 is provided anywhere along the arc G of the housing 110 out of a range of 90 degrees on opposite sides of the same line E of the receiver hole 114.

Further, as the T/R module 130 and the input module 120 are provided lengthwise together in the housing 110, the T/R module 130 may be formed to have a length corresponding to a half the length of the housing 110 or longer A spaced distance D (refer to FIG. 4) between the microphone holes 111, 112 and the speaker window 114 can be varied by design. In one example design, the distance D is less than 50 mm. In other designs, the spaced distance D may differ to a degree according to the sizes of the input module 120 and the T/R module 130 provided in the input device 100.

Figure 7:
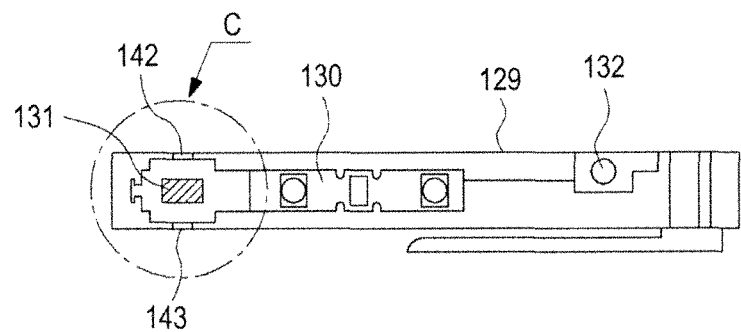
FIG. 7 is a view illustrating a transmitting/receiving module provided in the input device of FIG. 3.
Figure 8:
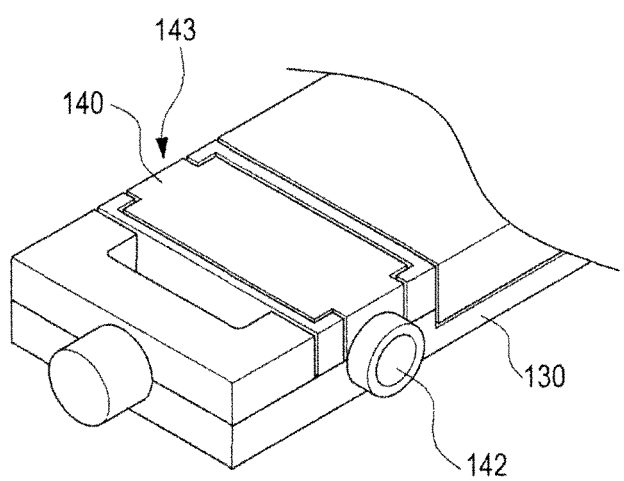
FIG. 8 is an enlarged rear view of portion C of FIG. 7.

FIG. 7 is a partial internal side view illustrating an example T/R module 130 provided in the input device of FIG. 3. FIG. 8 is an enlarged rear view of portion C of FIG. 7. Referring to FIGS. 7 and 8, the T/R module 130 is disposed within device 100 at the rear of the input module 120, and is mounted to an inner cylindrical surface of the housing 129 (inserted within housing 110) to implement near field Bluetooth communications with the portable terminal. In alternative embodiments, inner housing 129 may be eliminated, so that all components are housed within the common housing 110. Thus, the microphone holes 111, 112 and the speaker window 114 are formed at locations of the housing 110 proximate the microphone member 131 and the speaker 132, respectively, coupled to the T/R module 130 to allow sounds to be introduced into the microphone element 131 or allow sounds generated in the speaker 132 to exit to the outside. As the T/R module 130 is mounted to an inner cylindrical surface of the housing 129, the microphone holes 111, 112 are engaged with the respective sound paths 142 and 143, at a location between the input module 120 and the T/R module 130.

Thus, the microphone holes 111, 112 are located close to a central portion of the housing 110 between a near end and an opposite, far end of the housing 110. The microphone holes 111, 112 are communicatively connected to the respective first and second sound paths 142 and 143 and pass through inner and outer surfaces of the housing 110 to correspond to the number of the sound paths. The speaker window 114 is formed as an aperture in the far end of the housing 129 (or 110 in an alternative embodiment).

The sound transferring part 140 can be mounted to an end of the T/R module 130, as illustrated. (Alternatively, sound transferring part can be configured as a component separate from T/R module 130.) In detail, the mounting groove 133 provided at a rear surface of the microphone member 131 shown provided in the T/R module 130 with the housing 110 to transfer the sounds introduced through the microphone holes 111, 112 to the microphone element 131. In particular, in the present embodiment, the sound transferring part 140 provides sounds to excite microphone element 131 to generate a corresponding electrical signal which is processed by T/R module 130. A plurality of openings (hereinafter, referred to as paths 142 and 143) are formed such that the sounds introduced through the plurality of paths 142 and 143 are provided to the microphone element 131. In particular, as the paths 142 and 143 are provided on the same line H extending between holes 111, 112 across the diameter of housing 110, and transverse to pathway 141 which interfaces with microphone element 131. With this configuration, a sound gain can be secured by preventing irregularities of sounds introduced into the microphone holes 111, 112 or generated by the speaker 132 or errors of various sounds, and the sounds generated by the speaker 132 can be prevented from being reflectively input. This will be described further when the paths are described with reference to FIG. 9.

The sound transferring part 140 can be formed of a rubber material. Sound transferring part 140 is attached and coupled to the transmitting module 130 and the housing 110 in the exemplary embodiment, and the sounds introduced into the sound transferring part 140 and noise generated from the outside, for example, noise generated by speaker 132 and the like as the microphone element 131 and speaker 132 become closer may be introduced into the microphone element 131, in which case the sound transferring part 140 can prevent sound quality from being lowered.

FIG. 9 is an enlarged view illustrating a state where a sound transferring part is separated from a mounting groove of FIG. 8. FIG. 10 is a cutaway perspective view illustrating a cutaway section of an inner region of the sound transferring part of FIG. 9. Referring to FIGS. 9 and 10, the sound transferring part 140 includes an introduction part (third air pathway) 141 oriented transversely to the first and second air pathways (also called sound paths) 142 and 143 (see FIG. 6). The introduction part 141 is an opening passing through an upper surface of the sound transferring part 140, and if mounted to an end of the T/R module 130, the sound transferring part 140 is connected to one side of the microphone member 131, preferably, a lower side of the microphone member 131 to introduce sounds into the microphone member 131. Thus, a plurality of paths 142 and 143 are provided between the exterior of the sound transferring part 140 and the introduction part 141 to connect the exterior to the introduction part 141. Accordingly, the plurality of paths 142 and 143 are connected to be communicated with each other with respect to the introduction part 141, and the sounds from the exterior are transferred to the introduction part 141 (including the third air pathway) through the paths 142 and 143.

In the present embodiment, the first and second sound paths 142 and 143 are two openings linearly formed to face each other with respect to the introduction part 141. In alternative embodiments, two or more sound paths connected to the introduction part 141 may be possible, for example, three sound paths may be connected to the introduction part 141.

Further, it has been exemplified that the first and second sound paths 142 and 143 are formed in opposite directions (see FIG. 6) with respect to the introduction part 141, but the present invention is not limited thereto. The sound paths may be variously modified. For example, when the first and second sound paths 142 and 143 are formed, they are set to have a predetermined angle with respect to the introduction part 141, and if three sound paths are formed, the sound paths may be formed to have a 'Y'-shape with respect to the introduction part 141.

Opposite ends of the first sound path 142 are connected to the first microphone hole 111 and the introduction part 141, respectively, to transfer the outside sounds through the first microphone hole 111 to the introduction part 141. In the present embodiment, it has been exemplified that the input to the first sound path 142 (corresponding to microphone hole 111) is located on the same line E of the speaker 132. That is, the input to the first sound path 142 is located on the same line E where the speaker 132 corresponds to a lengthwise direction of the input device 100. However, as described above, the first sound path 142 input port may be provided at a location F in a range within +/−90 arc degrees along the housing circumference on opposite sides of the line E as well as on the same line E so that a sound gain can be secured by preventing irregularities of sounds introduced into the microphone holes 111 and/or 112 or generated by the speaker 132 or errors of various sounds. The second sound path 143 is located adjacent to the first sound path 142, and is connected to the first sound path 142 with respect to the introduction part 141. Opposite ends of the second sound path 143 are connected to the second microphone hole 112 and the introduction part 141, respectively, to transfer the outside sounds through the second microphone hole 112 to the introduction part 141. It has been exemplified that the second sound path 143 is formed in a direction opposite to that of the first sound path 142. However, the second sound path 143 is not limited to the location. That is, the input to the second sound path 143 may be provided at a location out of a range of +/−90 arc degrees on opposite sides of the same line E with respect to the same line E of the speaker so that the sounds generated by the speaker 132 are prevented from being reflected to be input to the microphone element 131, i.e., through the second sound path 143.

Accordingly, when the first microphone 111 for introducing sounds into the first sound path 142 is blocked so that sounds cannot be provided to the first sound path 142 (or are significantly dampened), for example, the first microphone hole 111 is blocked by foreign substances, when a user grips the input device 100 to transmit and receive signals, or when the microphone hole 111 is blocked by the user's hand, the user's voice cannot be adequately introduced into the first sound path 142. However, sounds can be introduced into the second sound path 143 through the second microphone hole 112 provided in a direction differing from those of the first sound path 142 and the first microphone hole 111, and the sounds introduced into the second sound path 143 may be introduced into the microphone element 131 through the introduction part 141 to allow smooth communications. Further, the opposite case is also possible.

According to embodiments of the present invention, in an input device for a portable terminal, as at least two sound paths for introducing sounds into the microphone element are connected to each other in the input device usable for both input and transmission/reception of signals, sounds can be easily introduced into the microphone element.

Further, even when one microphone hole is blocked and sounds cannot be introduced into the sound path connected to the microphone hole, sounds can be introduced into the microphone module through the other sound path connected to the microphone and the microphone hole, thereby preventing a dampening of the user's voice input. As the first sound path is located on the same line as the receiver or installed at a vicinity of a range of +/−90 arc degrees with respect to the speaker, the sound volume of the microphone can be regulated, and the second sound path is provided at a location out of a range of +/−90 arc degrees on opposite sides with respect to the location of the speaker, preventing a reflection input of the sounds generated by the speaker.

Accordingly, as many sounds can be introduced through the plurality of sound paths as compared with one sound path, a problem of sound dampening can be solved.

While exemplary embodiments described herein have been particularly shown and described, it will be understood by those of ordinary skill in the art that various changes in form and details may be made therein without departing from the spirit and scope of the invention as defined by the following claims.

What is claimed is:

1. An input device for a portable terminal, the input device comprising:
  a housing configured with at least first and second spaced apart microphone holes formed therein;
  a transmitting/receiving (T/R) module inside the housing, to transmit/receive communication signals to and from the portable terminal; and
  a sound transferring part provided within the housing to transfer sounds from the respective first and second microphone holes to a common surface of a microphone element, via a plurality of sound paths connected to the first and second microphone holes, wherein the plurality of sound paths include:
a first sound path extending from the first microphone hole and connected to the common surface of the microphone element through a third sound path; and
a second sound path extending from the second microphone hole and connected to the common surface of the microphone element through the third sound path.

2. The input device of claim 1, further comprising:
an input module enabling touch input to the portable terminal, disposed at a near end of the housing;
wherein the T/R module is configured to perform near field Bluetooth communications with the portable terminal, the T/R module disposed behind the input module within the housing.

3. The input device of claim 2, wherein the housing is cylindrical, and the first and second microphone holes are disposed on opposite ends of a diameter across a section of the housing.

4. The input device of claim 1, wherein the sound paths are each air conduits, the sound transferring part includes an introduction part having a third air pathway which provides the third sound path and which interfaces with the microphone element at the common surface; and
wherein
the first sound path begins at the first microphone hole and passing through a first air pathway and the third air pathway of the introduction part, and
the second sound path begins at the second microphone hole and passing through a second air pathway adjacent to the first air pathway, and through the third air pathway.

5. The input device of claim 4, wherein the first and second air pathways are aligned, and the third air pathway is transverse to the first and second air pathways.

6. The input device of claim 4, wherein a speaker is provided at an end of the T/R module, and a speaker window adjacent the speaker is formed in the housing.

7. The input device of claim 6, wherein an input port of the first air pathway is longitudinally aligned with the speaker within +/−90 arc degrees along a circumference of the housing.

8. The input device of claim 6, wherein an input port of the second air pathway is located on an opposite side of the housing with respect to the speaker window in a range of +/−90 arc degrees along a circumference of the housing.

9. The input device of claim 6, wherein a spaced distance between the first the microphone hole and the speaker window is within 50 mm.

10. The input device of claim 1, wherein the microphone element is mounted to one surface of a lower end of the T/R module, and the sound transferring part corresponds to a lower portion of the T/R module and is mounted to a mounting groove formed on a rear surface of the microphone element.

11. The input device of claim 1, wherein the sound transferring part is formed of a rubber material.

12. The input device of claim 1, wherein the input device includes a stylus pen.

13. An input device comprising:
a transmitting/receiving (T/R) module provided inside the input device and to which a microphone element and a speaker are electrically coupled to implement near field Bluetooth communications; and
a sound transferring part forming a plurality of sound paths for providing sounds incident to a common surface of the microphone element,
wherein the plurality of sound paths include:
a first sound path connected to the common surface of the microphone element through a third sound path; and
a second sound path connected to the common surface of the microphone element through the third sound path,
wherein the first sound path and the second sound path extend from the third sound path in different respective directions.

14. The input device of claim 13, wherein the sound transferring part includes
an introduction part, including the third sound path, for transferring sounds to the microphone element at the common surface, and
the first and second sound paths are connected to the introduction part to provide sounds to the introduction part.

15. The input device of claim 14, wherein the sound paths are connected to each other with respect to the introduction part.

16. The input device of claim 15, wherein an input port of at least one of the sound paths is longitudinally aligned with the speaker within +/−90 arc degrees along a circumference of a housing, and an input port of another one of the sound paths is located on an opposing side of the speaker with respect to the circumference.

17. The input device of claim 16, wherein a spaced distance of the microphone element and the speaker is within 50 mm.

18. The input device of claim 16, wherein the first and second sound paths are aligned along a common axis, and the third sound path is oriented transverse to the axis.

19. The input device of claim 15, wherein the input device includes a housing for accommodating an input module and the T/R module, a plurality of microphone holes engaged with the sound paths to introduce sounds into the sound paths.

20. The input device of claim 13, wherein the sound transferring part is formed of a rubber material.

21. An input device for a portable terminal, the input device comprising:
a housing configured with a first and second microphone holes which spaced apart from each other;
a transmitting/receiving (T/R) module inside the housing, to transmit/receive communication signals to and from the portable terminal; and
a sound transferring part provided within the housing to transfer sounds to a microphone element via a plurality of sound paths connected to the first and second microphone holes,
wherein the first microphone hole is provided on the same line with a speaker of the T/R module, the second microphone hole is provided at a position opposite to the first microphone hole,
wherein the plurality of sound paths comprise a first sound path connecting the first microphone hole, a second sound path connecting the second microphone hole and a third sound path in between and connecting the first sound path and the second sound path and interfacing with a surface of the microphone element.

22. The input device of claim 21, wherein the first sound path, the second sound path, and the third sound path together form a T-shaped structure, with the third sound path forming a base of the T-shaped structure and the first and second sound paths forming respective arms of the T-shaped structure.

* * * * *